July 8, 1958 H. J. GEISLER 2,842,313

FERROELECTRIC ACCUMULATOR

Original Filed Oct. 1, 1953

INVENTOR
HELMUT JOHN GEISLER
BY William V. Schelberg
AGENT 2,842,313

FERROELECTRIC ACCUMULATOR

Helmut J. Geisler, Wappingers Falls, N. Y., assignor to International Business Machines Corporation, New York, N. Y., a corporation of New York Continuation of application Serial No. 383,526, October 1, 1953. This application December 28, 1956, Serial No. 631,326

11 Claims. (Cl. 235—92)

This invention relates to information handling systems of the variety in which binary digits are stored progressively in a series of consecutive stages comprising one or more ferroelectric capacitors, as described in the copending application Serial Number 383,526, filed October 1, 1953, and now abandoned, to which this application is related as a continuation. The invention is directed in particular to a circuit arrangement for controlling the transfer of binary representations between the several stages in response to shifting the position of a standing wave of voltage on a transmission line or other conducting medium.

Ferroelectric capacitors employ dielectrics which depend upon internal polarization of the material rather than upon surface charge for storage, and a number of ferroelectric materials are known such as barium titanate, Rochelle salt and potassium niobate, for example. Ferroelectric capacitors are so designated because of characteristic similarities to ferromagnetic materials rather than composition, and a curve representing dielectric induction plotted versus electric field intensity is comparable to the B—H curve or hysteresis loop for ferromagnetic elements.

Arrangements of ferroelectric capacitors in cascade coupled stages with each stage composed of one or more capacitor elements is known to the art, however, the function of transferring a pulse representation from one stage to an adjacent stage without causing a change in polarization of the ferroelectric elements in a reverse order or indiscriminately has remained unreliable in many arrangements.

Accordingly, an object of this invention is to provide a reliable transfer circuit for coupling successive stages of ferroelectric storage systems.

Another object is to provide a novel circuit arrangement for a ferroelectric capacitor delay line employing a combination of priming and alternate stepping actions.

Still another object is to provide a ferroelectric capacitor storage system employing a novel transfer device which is responsive to the shifting of the position of a standing wave of voltage along a transmission line.

A further object is to provide a novel ferroelectric accumulator system which is operable at high speeds and employs a standing wave transfer device.

Other objects of the invention will be pointed out in the following description and claims and illustrated in the accompanying drawings, which disclose, by way of example, the principle of the invention and the best mode, which has been contemplated, of applying that principle.

Figure 1:
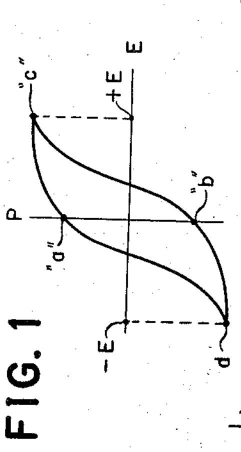
Figure 1 is a diagrammatic representation of the hysteresis curve for a ferroelectric capacitor such as that employed in the system illustrated and described.

In ferroelectric capacitors such as those employed in memory systems, materials having substantially rectangular hysteresis loops and low coercive force are desired. The hysteresis loop for a barium titanate crystal of this type is illustrated in Figure 1 where the vertical axis represents the electrical displacement or degree of polarization P and the horizontal axis represents the electric field strength E which is proportional to the voltage applied across the terminals of the capacitor. In storing binary information, the state of polarization designated "*b*" is arbitrarily selected as representing a binary "zero" and stage "*a*" then represents storage of a binary "one." With the ferroelectric capacitor in a zero state "*b*," application of a positive pulse causes the hysteresis loop to be traversed from point "*b*" to point "*c*", which is the saturation point, and, on removal of this applied electric field, returns to point "*a*" at which it remains in a stable condition representing a binary one. A negative pulse is applied on readout and, with the capacitor in a state representing a stored binary one, the hysteresis curve is traversed from the point "*a*" to point "*d*", and, when the pulse terminates, goes to point "*b*". The slope of the hysteresis curve between points "*a*" and "*d*" is relatively great and, as the slope is proportional to the effective capacitance of the ferroelectric condenser, the change in polarization in going from point "*a*" to point "*d*" presents a large capacitance to the negative read-out pulse. Application of the negative read-out pulse in interrogating a capacitor which is in a binary zero representing state causes the hysteresis curve to be traversed from point "*b*" to point "*d*" and, on termination of the read-out pulse, returns to point "*b*". The slope of the hysteresis curve between points "*b*" and "*d*" is small and this change in polarization, therefore, presents a low capacitance to the negative read-out pulse.

The points "*a*" and "*b*" are stable states of polarization and binary information thus represented and stored in the dielectric will remain for a considerable period without requiring application of energy from an external source for its maintainence. At the stable points "*a*" and "*b*", there is no net field within the ferroelectric condenser or external to it and the polarization charge is equal and opposite to the surface charge. Consequently, conduction through the dielectric does not destroy the information and the external leads may even be shorted without ill effect or loss of information.

An electric field applied as a voltage pulse to the terminals of the ferroelectric condenser and of such magnitude as to exceed the coercive force, changes the polarization at a rate determined by the magnitude of the field and, if a negative pulse is applied for interrogation, either a transition from point "*a*" to point "*b*" or no net change takes place. This transition is equivalent to a net change in the charge across the ferroelectric condenser as described above and can be detected as a voltage appearing across a second element connected in series with it.

Figure 2:
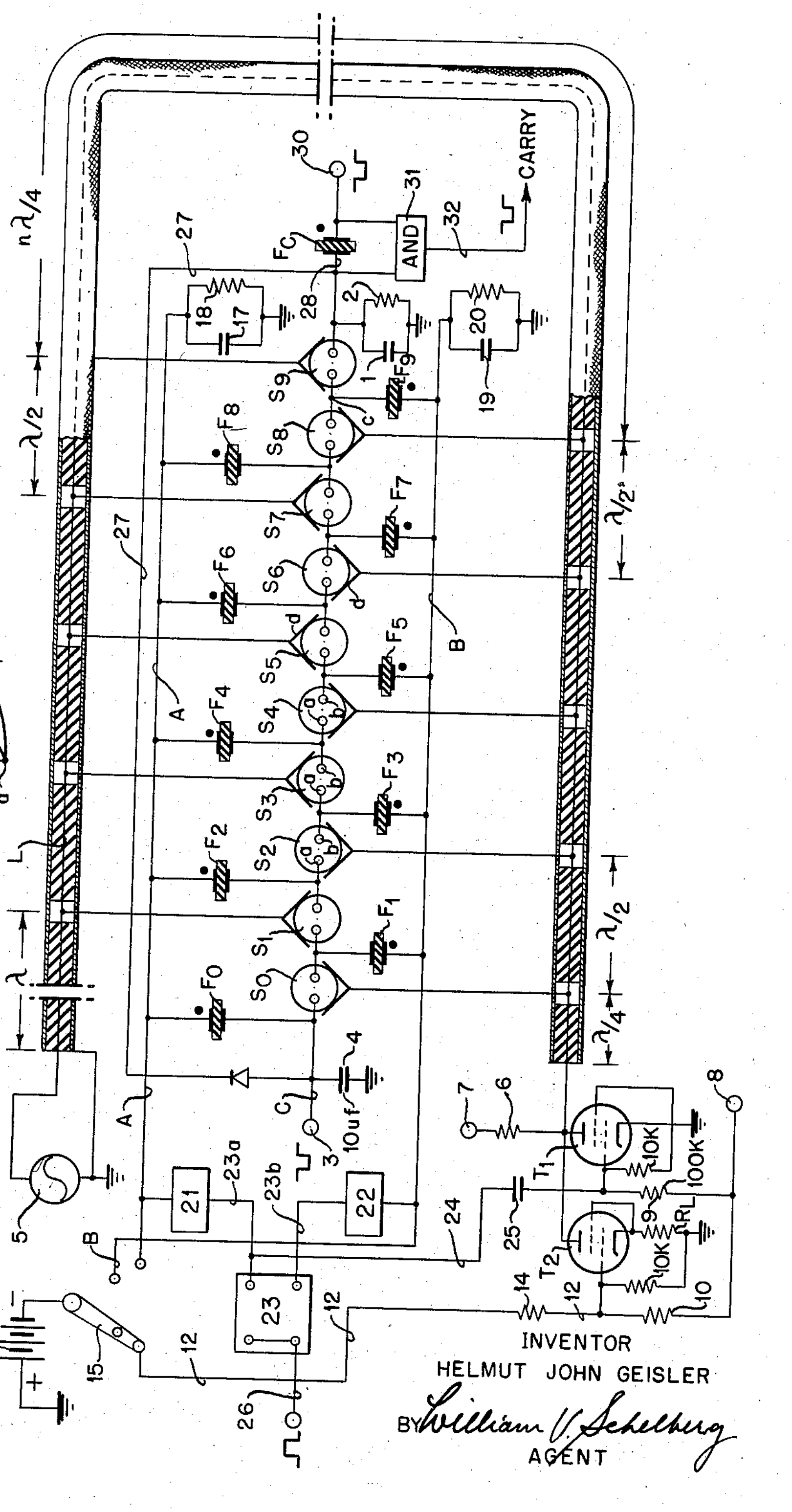
Figure 2 is a schematic diagram of a ferroelectric capacitor delay line employed as an accumulator.

Figure 2 illustrates an arrangement employing such a method of pulsing ferroelectric capacitors and producing output voltages indicative of their states of polarization or binary storage representations. In this figure, ten stages of a delay line are employed with ferroelectric storage capacitors designated F at each stage. Obviously, any number of stages may be provided, however, ten are shown so that the illustrated device may operate as a decimal accumulator. The capacitors F are given subscript labels corresponding with their consecutive arrangement with the home position capacitor designated $F_0$. Alternate ones of the ferroelectric capacitors F are connected at one terminal to respective ones of a pair of lines A and B to which pulses to be counted are applied, as will be later described, in advancing a binary representation from stage to stage. A polarity marking symbol consisting of a dot is shown adjacent one terminal of each of the condensers $F_1$, $F_2$, $F_3$, etc. Referring to the hysteresis loop of Figure 1, if a voltage pulse E is applied to a particular ferroelectric capacitor F with the polarity such that the positive terminal of the pulse source is connected to the "dot" side of the condenser, the polarization state exists at point "*c*" for the duration of the applied positive pulse and will shift to point "*a*" on its termination. If the negative terminal of the pulse source is connected to the "dot" labeled side of the ferroelectric condenser, then it exists at point "*d*" and will return to point "*b*" on termination of the negative pulse. On the other hand, pulses of opposite polarity applied to the unmarked side of the condenser produce the same effects.

Referring again to Figure 2, the remaining terminals of each of the ferroelectric capacitors F are connected to a line C at points thereon separated by radio frequency actuated gas switch tubes S connected in series in the line. The line C is coupled to ground at one end through an RC network 1—2 and at the other end is connected to a terminal 3 to which reset pulses are applied as will be more fully described. This terminal is also connected to ground through a capacitor 4 and this capacitor along with network 1—2 provides a return path for radio frequency energy applied to the switch tubes S.

The switch tubes S are of a type described in detail in my copending patent application Serial No. 334,053, filed January 29, 1953, and will be but briefly described here. Each of the tubes S comprise two electrodes *a* and *b* positioned within the envelope and a third electrode *d* encircling the tube envelope adjacent the ends of the internal electrodes. Application of radio frequency energy between the external band electrode *d* and both of the internal electrodes *a* and *b* produces an auxiliary radio frequency discharge in the gaseous filling which, during this time, allows flow of direct current energy between the internal electrodes.

The external band electrodes of alternate ones of said tubes S are connected to a coaxial transmission line L at points located at even and odd multiples of quarter wavelength distances from a source of radio frequency energy 5 coupled thereto. The coaxial cable L is shown folded, however, it may be straight or bent into any other configuration in accordance with conventional U. H. F. practice. The connections to the upper section of the line from alternate switch tubes S are spaced apart a distance equal to one half the wavelength of the exciting frequency and at even multiples of one quarter wavelength from the source 5. The connections to the other alternate group of tubes S are made to the lower section and are spaced apart a distance equal to one half the wavelength of the exciting frequency but spaced from the terminals of the line and from the source 10 a distance equal to an odd multiple of one quarter of the exciting wavelength.

The line L is terminated by a pair of tubes $T_1$ and $T_2$, the plates of which are connected to the inner conductor of the line. The cathode of $T_1$ is grounded as is the outer shield conductor. A resistor $R_L$ is connected between the cathode of tube $T_2$ and ground and is adjusted to have a value approximately equal to the characteristic impedance of the line L. With tube $T_1$ rendered conductive, the line L is then terminated in a short circuit through the tube and with tube $T_2$ conductive and $T_1$ non-conductive, the line L is terminated in its characteristic impedance. With neither of the tubes $T_1$ and $T_2$ conductive, line L is terminated in an open circuit.

As shown in the figure, the plates of each of the tubes are also connected through a resistor 6 to a source of positive potential applied at terminal 7, and their control grids are biased negatively through connection to a negatively biased terminal 8 through grid resistors 9 and 10 respectively. The grid of tube $T_2$ is also connected through a lead 12 and a coupling resistor 14 to a normally closed contact of a multiple switch 15 which connects to a source of negative potential 16 shown grounded at its positive terminal. One terminal of each of the lines A and B is also connected to a contact of the multiple switch 15 and the lines are subjected to a negative pulse on closure thereof. The other terminals of the lines A and B are connected to ground through paralleled RC networks 17—18 and 19—20 respectively. Lines A and B are further connected through blocking oscillators, labeled 21 and 22 respectively, to the output terminals of a trigger unit 23. The output terminal connected to blocking oscillator 21 is also connected by a lead 24 to the grid of the tube $T_1$ through a coupling capacitor 25. Input pulses to be counted are applied to a lead 26 which connects to the input of the trigger unit 23.

The trigger unit 23 and blocking oscillators 21 and 22 are of conventional design and are shown in block diagram form as they are well known in the art and form no part per se of the present invention. The blocking oscillators may be any type of oscillator which cuts itself off after one cycle on account of the accumulation of a charge on its grid capacitor. In this type of circuit, an output pulse is obtained in response to application of a positive pulse to the grid of the oscillator tube. These pulses are supplied in the instant case from trigger unit 23 which, because of the general characteristics of such circuits, is unable itself to supply a pulse of sufficient power to be applied directly to lines A and B through an inverter circuit. Triggers or flip-flop circuits conventionally include two vacuum tubes so interconnected that when one is conductive the other is cut off. The conventional trigger circuit will remain in either of these two states stably until a controlling pulse is applied to reverse the conductive status of the two tubes. Voltage values at points in the trigger circuit differ according to whether the tubes are in one or the other relative conductive status and such voltage variations are used for various circuit controlling purposes generally as is well-known.

Accumulation in the system illustrated is effected by alternately pulsing the upper and lower banks of switches, that is, the alternately arranged odd and even numbered switches S, with radio frequency energy in coincidence with control of the voltage levels applied to the lines A and B. This action progressively dumps a charge on one ferroelectric condenser to another by a combination of priming and alternate stepping action. The switch tubes S are rendered conductive on application of radio frequency energy between the external electrode *d* and the two internal electrodes *a* and *b* as previously mentioned. With high frequency energy supplied to the coaxial line L from the generator 5, a standing wave of energy on the line has maximum voltage points which coincide with the connections to the odd numbered tubes $S_1$, $S_3$, $S_5$, $S_7$ and $S_9$ when the line L is terminated in an open circuit as with tubes $T_1$ and $T_2$ nonconductive. With tube $T_1$ in a conductive state, the line L is terminated in a short circuit and the nodal points of the radio frequency energy wave are located at odd quarter wavelength intervals from the terminus and result in rendering only the switch tubes $S_0$, $S_2$, $S_4$, $S_6$ and $S_8$ conductive.

Tube $T_2$ may be rendered conductive alone and the coaxial line L is then terminated in its characteristic impedance $R_L$ with the result that no standing waves appear on the line and all of the switch tubes S are ignited by the energy supplied from the generator 5.

In initially resetting the accumulator, the switch 15 is operated from its normally closed position in contact with the terminal connected with lead 12 and the negative bias on the grid of tube $T_2$ is lessened so that the firing potential applied to the tube plate from terminal 7 and through resistor 6 is sufficient to render the tube conductive. The coaxial line L is now terminated in its characteristic impedance $R_L$ and each of the switch tubes S is energized with no standing radio frequency energy waves appearing on the line. Operation of the switch 15 from its normal position also simultaneously applies a negative potential from source 16 to each of the lines A and B. A negative potential is thus applied to the dot marked side of each of the storage capacitors $F_1$ to $F_9$ as well as to the home position capacitor $F_0$ and each is charged uniformly to point "$d$" on the hysteresis curve shown in Figure 1. The unmarked side of each of the capacitors F is connected to ground through the conductive switches S and the resistor 2. The switch 15 is now returned to its normal position and tube $T_2$ is cut off with the result that each of the capacitors F now have no electric field applied and traverse their hysteresis curves from the point "$d$" to the zero representing point "$b$". With both of the tubes $T_1$ and $T_2$ non-conductive, the switch tubes with odd subscript numbers are connected to points on the coaxial line at which the maximum points of the standing R. F. voltage wave exists since the line is open circuited. To enter a binary one representation in the home position capacitor so that it may be progressively shifted in response to count pulses, a reset pulse of negative polarity is applied to terminal 3 of the line C from a source not shown. This negative pulse is applied to the unmarked terminal of the ferroelectric capacitor $F_0$ but does not pass further down the line C as switch tube $S_0$ is not energized. Application of a negative pulse to the unmarked side of $F_0$ is equivalent to a positive pulse to the dot marked side as mentioned heretofore and this ferroelectric capacitor now traverses its hysteresis curve from point "$b$" to point "$c$" and, on termination of the reset pulse, return to point "$a$".

A first input pulse to be counted is applied to terminal 26 and to the input of the trigger unit 23 causing the unit to change from one equilibrium state to the other and a positive pulse is produced on output leads **23*a*. This pulse is applied simultaneously to the blocking oscillator 21 and via lead 24 and capacitor 25 to the grid of tube $T_1$. The latter is rendered conductive and the line L is terminated in a short circuit causing the switch $S_0$, $S_2$, $S_4$, $S_6$ and $S_8$ to be energized and the odd numbered switch tubes S to be deenergized. The blocking oscillator 21 produces a negative output pulse in response to the pulse received from trigger 23 and this negative pulse is applied to lead A and to the dot marked side of condensers $F_0$, $F_2$, $F_4$, $F_6$ and $F_8$. Condenser $F_0$ stands at point "$a$" in its hysteresis curve while condensers $F_2$, $F_4$, etc., stand at point "$b$". The negative pulse causes the latter condensers to shift from point "$b$" to point "$d$" for the duration of the pulse, however, condenser $F_0$ shifts from point "$a$" to point "$b$" for this period and, as it cannot charge to the opposite polarity instantaneously, it acts as a low resistance path allowing the negative pulse to be applied through the conductive switch tube $S_0$ to the unmarked terminal of capacitor $F_1$. This condenser is also standing at point "$b$" and since the action of the negative pulse to the unmarked terminal is equivalent to a positive pulse applied to the dot marked terminal, condenser $F_1$ traverses its hysteresis loop from point "$b$" to point "$c$" and, on condenser $F_0$ becoming charged and the pulse from unit 21 terminating, returns to point "$a$". Condensers $F_2$–$F_8$ do not dump their charges into condensers $F_3$–$F_9$ as their bound charges are in the same direction of polarity as the signal applied to line A even though the switch tubes $S_2$–$S_8$ are energized. The binary one representing state initially present in capacitor $F_0$ has now been transferred to capacitor $F_1$ on application of the first input pulse to terminal 26. The second pulse to be counted and subsequently applied to the trigger 23 causes it to change to its other equilibrium state and a positive pulse is applied to the blocking oscillator 22 via conductor 23*b* while tube $T_1$ is simultaneously cut off. The line L is then terminated in an open circuit and the even numbered switch tubes S are connected to points of voltage maximum of the standing radio frequency waves causing them to be energized while the odd numbered switch tubes are inactivated. Blocking oscillator 22 now produces a negative output pulse in response to the signal from trigger 23 and the dot marked terminals of the lower bank of ferroelectric capacitors connected to lead B are subjected to a negative electric field. Capacitors $F_3$, $F_5$, $F_7$ and $F_9$ are standing at point "$b$" on their hysteresis curves and shift to point "$d$" for the pulse interval, however, $F_1$ stands at point "$a$" and shifts to point "$d$". As capacitor $F_1$ cannot change its polarization instantaneously, the negative pulse is applied through the activated switch $S_1$ to the unmarked terminal of capacitor $F_2$ but may not pass switches $S_0$ and $S_2$ as these switch tubes are inactive. The negative pulse applied to this terminal of $F_2$ causes it to traverse its hysteresis loop from point "$b$" to point "$c$" and when the condenser $F_1$ is fully charged, returns to point "$a$". The second input pulse has now shifted the charge on $F_1$ to $F_2$. Subsequently applied input pulses to be counted cause the trigger to flip and the charge progresses from one condenser to another in a similar manner until application of the ninth or tenth input pulse in the decimal arrangement illustrated. At this point, it may be noted that any number of stages may be provided as desired within the capacity of the generator 5 to supply radio frequency energy to the line and energize the switch tubes S. In the decimal system, the tenth input pulse causes condenser $F_9$ to dump its charge back into the home position capacitor $F_0$ through the switch tube $S_9$ and lead 27 and at the same time causes an output pulse to appear on a lead 28 on receipt of each tenth input pulse. This output pulse may be stored in a further ferroelectric capacitor $F_C$ and directed to a succeeding higher order decimal accumulator of similar structure on receipt of a carry impulse at an interval of time between application of input pulses to the several orders of accumulators. As shown in the figure, the carry capacitor $F_C$ is normally standing at point "$b$" on its hysteresis curve and the negative pulse developed on lead 28 on receipt of a tenth input pulse causes $F_C$ to traverse its hysteresis loop to point "$c$" and subsequently to point "$a$". During the aforementioned interval during which input pulses are not applied to terminal 26 of the counters, a negative carry pulse is applied to terminal 30 and to one input of a minus And circuit 31. As this negative carry pulse is applied to the dot marked side of condenser $F_C$, it changes polarization from point "$a$" to point "$b$" and, therefore, since it presents low reactance to the carry pulse, it is also applied to the other input of the minus And circuit 31 so that with both inputs simultaneously negative, an output is obtained via lead 32 that may be inverted and applied to the input terminal 26 of the succeeding accumulator order. If the counter has not passed ten at the time the carry pulse is applied, then the condenser $F_C$ shifts from point "$a$" to point "$c$" presenting a high reactance so that the other input to the And circuit 31 from lead 28 is not pulsed and no carry pulse is produced on line 31**.

While the transfer arrangement has been shown in the environment of a decimal counter and accumulator, it is obvious that each section or stage is a delay line or register to which clock pulses may be applied, alternately to lines A and B, to cause a progressive shift in the position of storage of binary representations in the several registers.

While there have been shown and described and pointed out the fundamental novel features of tthe invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A pulse controlling circuit comprising a plurality of ferroelectric capacitor storage elements each having two terminals and capable of assuming alternate stable states of polarization in response to electric fields of opposite polarity applied thereto, switch means connecting one terminal of each capacitor element with one terminal of an adjacent one of said capacitor elements, and advancing means comprising means for successively operating alternate ones of said switch means and further means for simultaneously applying an electric field to the other terminal of alternate ones of said ferroelectric capacitor elements, said electric field being sufficient to cause any of said elements in one stable state to switch to the other stable state.

2. Apparatus as set forth in claim 1 in which said further means includes a pair of conductors individually coupled to the other terminals of alternate ones of said ferroelectric storage elements, said conductors being alternately subjected to pulses in response to operation of said advancing means.

3. Apparatus as set forth in claim 1 wherein said switch means comprise radio frequency actuated switch tubes coupled to a transmission line and operated in response to variations in the terminal impedance of said line as controlled by said advancing means.

4. In a counter arrangement, a plurality of digit position representing ferroelectric storage capacitors each capable of assuming alternate stable states of polarization, advancing means operated in response to receipt of input count pulses and adapted to apply a controlling potential to one terminal of alternate ones of said storage capacitors corresponding with the sequence of application of alternate input count pulses, switch means coupling the remaining terminal of adjacent ones of said storage capacitors with alternate ones of said switch means activated by said advancing means in response to receipt of alternate ones of said input count pulses.

5. Apparatus as set forth in claim 4 wherein said switch means coupling the remaining terminal of adjacent ones of said storage capacitors comprise radio frequency actuated gas switch tubes.

6. Apparatus as set forth in claim 4 wherein said advancing means includes a pair of conductors individually coupled to said one terminal of alternate ones of said storage capacitors, said conductors being alternately subjected to pulses in response to receipt of pulses to be counted.

7. In a ferroelectric counter, a plurality of ferroelectric capacitor storage elements each capable of assuming either a first or a second stable state of polarization and with only one of said elements being in said first state, radio frequency actuated transfer circuit means coupling said elements in a closed ring, advancing means operated in response to receipt of input pulses for causing the storage element adjacent that element in a first stable state to assume a first stable state and said preceding element to revert to said second stable state in response to application of an input pulse to be counted so that said storage elements assume a first stable state in predetermined sequence corresponding with the sequence of application of said input pulses.

8. Apparatus as set forth in claim 7 wherein said advancing means comprises a pair of conductors individually connected to alternate ones of said ferroelectric storage elements, said conductors being alternately subjected to pulses in response to receipt of input pulses to be counted by said advancing means.

9. Apparatus for transferring information comprising a plurality of ferroelectric storage elements each capable of assuming alternate stable states of polarization in response to the application of voltage pulses, means for causing at least one of said capacitors to assume one of said stable states of polarization, means for causing those capacitors set in one stable state to be reset to the other stable state, a transmission medium, means coupling adjacent ones of said ferroelectric capacitors comprising individual switch means operated to connect said adjacent capacitors in response to shifting a standing wave of energy on said transmission medium, and means coupled to said transmission medium for shifting a standing wave of energy thereon.

10. An accumulator system composed of a plurality of ferroelectric counter units, radio frequency actuated transfer circuit means, one for each order of the accumulator, each of said counting units comprising a group of ferroelectric storage elements individually coupled by said radio frequency actuated transfer circuit means to form a closed ring, each of said storage elements being capable of assuming either a first or a second stable state of polarization and with only one of said elements initially being in said first state, advancing means operated in response to receipt of input count pulses for activating alternate ones of said transfer circuit means and simultaneously causing the ferroelectric storage element adjacent that element in a first stable state to assume a first stable state and that element to revert to the second stable state so that said group of storage elements assume a first stable state in predetermined sequence corresponding with the operation of said advancing means, and carry means actuated in response to transfer of a predetermined one of said elements in each order from a first stable state to a second stable state, said carry means being coupled to the advancing means of the next higher order counter of said accumulator.

11. A ferroelectric counting chain comprising a plurality of cascade coupled ferroelectric capacitors, advancing means comprising a pair of conductors to which alternate ones of said capacitors are respectively connected, reset means coupled to said conductors for causing each of said capacitors to be set in one of two stable polarization states and for thereafter causing a selected one of said capacitors to be set in the order of said stable states, a source of radio frequency energy, a transmission medium, means coupling said source to said transmission medium at one end thereof and means coupled to the other end thereof for varying the termination impedance, transfer means comprising radio frequency actuated gas switch tubes connected between adjacent ones of said ferroelectric capacitors with alternate ones of said switch tubes connected to said transmission medium at points spaced a distance equal to a multiple of one half wave length of the exciting frequency of said source and a like distance from said other end thereof, remaining ones of said switch tubes being connected to said transmission medium at like intervals but spaced from said other end a distance equal to an odd quarter wavelength of said frequency, and means for varying the terminal impedance of said transmission medium simultaneously with actuation of said advancing means.

References Cited in the file of this patent

UNITED STATES PATENTS 2,717,372 Anderson -------------- Sept. 6, 1955

OTHER REFERENCES

"Ferroelectric storage elements for digital computers and switching systems," by J. R. Anderson, Electrical Engineering, October 1952, pages 916–921.